United States Patent [19]
Schiefer et al.

[11] 3,992,943
[45] Nov. 23, 1976

[54] TWO-INPUT PYROMETER

[75] Inventors: Peter Schiefer, Mulheim; Heinz Bosebeck, Mettmann, both of Germany

[73] Assignee: Mannesmann Aktiengesellschaft, Dusseldorf, Germany

[22] Filed: Jan. 30, 1975

[21] Appl. No.: 545,415

[30] Foreign Application Priority Data
Feb. 4, 1974 Germany............................ 2405651

[52] U.S. Cl. ................................ 73/355 R; 356/45
[51] Int. Cl.² ......................... G01J 5/30; G01J 5/60
[58] Field of Search ................... 73/355 R, 355 EM; 356/45

[56] References Cited
UNITED STATES PATENTS

| | | | |
|---|---|---|---|
| 3,303,340 | 2/1967 | Hewett et al.................. | 73/355 R X |
| 3,435,237 | 3/1969 | Collins .......................... | 73/355 R X |
| 3,526,135 | 9/1970 | Wortz ............................ | 73/355 R |
| 3,654,809 | 4/1972 | Worden et al. ................ | 73/355 R |
| 3,672,217 | 6/1972 | Naya et al...................... | 73/355 EM |
| 3,715,922 | 2/1973 | Menge ............................ | 73/355 EM |
| 3,766,781 | 10/1973 | Roberts............................ | 73/355 R |
| 3,777,568 | 12/1973 | Risgin et al..................... | 73/355 EM |
| 3,849,000 | 11/1974 | Soardo et al................... | 73/355 R X |

*Primary Examiner*—Herbert Goldstein
*Assistant Examiner*—John S. Appleman
*Attorney, Agent, or Firm*—Ralf H. Siegemund

[57] ABSTRACT

Two photoelements with inputs for different wave lengths of radiation from a common source are serially connected individually to the inputs of high gain inverting amplifiers with feedback to adjust the voltage across the photoelement to zero, so that the outputs of the amplifiers are proportional to the short circuit currents through the photoelements. An algebraic calculating circuit forms the ratio of the outputs of the amplifier and provides for indication and/or control. The effectiveness of this ratio output is controlled in dependence upon proper orientation to the radiation emitting source.

6 Claims, 2 Drawing Figures

$y = \left(\dfrac{x}{z}\right)^m$

TWO-INPUT PYROMETER

BACKGROUND OF THE INVENTION

The present invention relates to radiation pyrometry, wherein the radiation densities of two different wave lengths are separately monitored and detected for obtaining an indication of temperature.

The so-called ratio pyrometers use the radiation from a common source, and photoelements or the like are provided to detect the radiation density of two different wavelengths. The resulting electrical signals are processed by forming their quotient or ratio which is indicative of temperature. This method is very advantageous for measuring the temperature of rather hot objects, possibly even moving objects, such as rolled ingots having a temperature of, say, between 700° and 1200° Centrigrade. The monitoring of welding seams requires responses even for still higher temperatures. The method outlined above and using two separate radiation components has certain advantages over the summary or integrating detection of radiation density (covering a wide range of the spectrum) or over the detection of the radiation density of a single wavelength. Any interference due to variable emission of the surface or any absorbtion in the radiation path will cause only little change in the result, because any influence that mathematically amounts to a multiplication of the density or intensity as detected, by the same "factor" as to each of the two components will cancel on formation of the ratio.

In one known apparatus of this type one uses photoelements "loaded" with a passive resistor of a few hundred Ohms to obtain voltages in the range of a few millivolts. The two photoelements are connected so that the respective voltages oppose, and together they establish one half of a bridge. This bridge is connected to the input of a null-amplifier whose output controls an actuator. This actuator changes the load on one of the elements until the input voltage across the input of the amplifier is again zero. The output current or voltage of this high gain amplifier constitutes a measure for the radiation temperature.

The accuracy of this known equipment is, however, not sufficient for some cases. For example, if the ultimate goal is texture control of hot rolled steel, a higher sensitivity of measurement and response is needed. This is apparently due to lack of stability and offset and other errors of the amplifier. Also the various wires in the circuit may establish thermoelements which produce error voltages therein. Moreover, the photoelements are operated under load conditions in which the load current through the photoelements is not proportional to illumination density.

SUMMARY OF THE INVENTION

It is an object of the present invention to provide for new and improved equipment for determining the temperature pyrometrically and on the basis of detecting emitted radiation under conditions of high accuracy and long term stability.

It is a particular object of the invention to monitor the temperature of rolled stock and of welding seams, preferably over a wide range of variations in temperature.

It is another object of the invention to measure radiation temperature of objects in excess of 700° C, even in excess of 1200° C, and in the range between these temperatures.

In accordance with the preferred embodiment of the invention, it is suggested to use two photoelements respectively in series with input terminals of two similar high gain - inverting amplifiers, each having a feedback resistor, so that the effective voltage as dynamically established across each photoelemt is zero. The currents through the elements are, therefore, the short circuit currents for the particular radiation intensity received, and the output voltages of the amplifiers are respectively proportional thereto. The two outputs are fed to a quotient forming circuit. It is important that the outputs of the amplifiers are, in fact, essentially independent from the input impedances of the quotient-forming, analog computer. The amplifiers, therefore, raise the rather small level of the photoelement signals to a more useful level for ratio formation without being dependent on the load on the amplifier. This way one uses the rather advantageous properties of photoelements to the fullest, and the amplifier circuits isolate the photoelements from the load conditions and operation of the algebraic, ratio-forming circuit.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawing, FIG. 1 shows photoelements 1 and 2 constructed for or having appropriate optical filters for receiving two different wavelengths of radiation as emitted e.g. by rolled stock 18, (FIG. 2). The two photoelements are respectively connected between ground and inverting inputs 7 and 8 of amplifiers 3 and 4.

Figure 1:
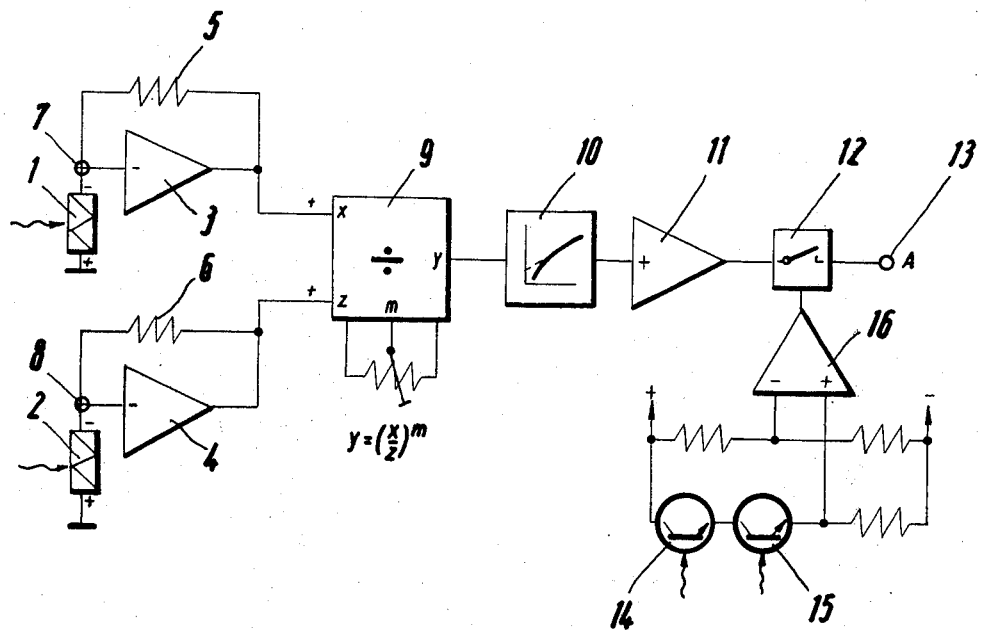
FIG. 1 is a block and wiring diagram of the preferred embodiment of the present invention.

The inverted output signals of the amplifiers are fed back via resistors 5 and 6, to the input current nodes 7 and 8. The amplifiers drive a current flow through the feedback resistors, so that the current in each of the nodes 7 and 8 is zero. Accordingly, the feedback current equals the respective photoelement currents and the voltage across the respective feedback resistor is proportional to that current needed in either case to establish zero current in the respective input node.

By operation of the afore described feedback, the voltage across the photoelements 1 and 2 is reduced to zero, i.e. ground potential is dynamically established at the current nodes. As a consequence, the current driven by the amplifiers through the respective feedback resistor equals the short circuit current through the respective photoelement. Therefore, the output voltages of amplifiers 3 and 4 are proportional to the short circuit current through the respective photoelements in each instance, which, of course, depends on the illumination received.

The output voltages of the amplifiers are fed to the analog divider 9 with inputs X and Z. The output Y of analog computer 9 is formed generally on the basis of the computation or calculation $Y = (X/Z)^m$, whereby the exponent $m$ is adjustable. The voltage Y is indicative of the temperature of the rolled stock. The input voltages may vary between 0.01 and 10 Volts for temperature variations from below 700° to above 1200° C.

In order to obtain a large range for temperature measurement, and here particularly a large range of proportionality between rolled stock temperature and indication, a linearizing circuit 10 is connected between computer 9 and output 13. The circuit 10 may be comprised of several adjustable diode - resistor networks.

In addition, an impedance matching circuit 11 and a switch 12 are interposed between calculator or computer and output 13. If switch 12 is closed, the linearized and impedance-matched output signal of circuit 9 is available directly at output terminal 13 and can be used for visual indication, recording or as a control signal.

The switch 12 is operated by photo-transistors 14 and 15 operating a differential amplifier 16. Switch 12 is particularly turned on when the rolled stock illuminates both transistors. If one of the transistors is not illuminated or significantly less than the respective other one, switch 12 is turned off as an indication that the pyrometer is not properly oriented to the source of radiation, it is supposed to observe and, possibly, supervise.

The circuitry is preferably constructed as integrated circuits to minimize the use of wiring, so that thermoelements are not produced. It should be noted, however, that as long as the input and feedback circuits of the amplifiers remain free from superimposed disturbances, the measurement will retain its accuracy.

Figure 2:
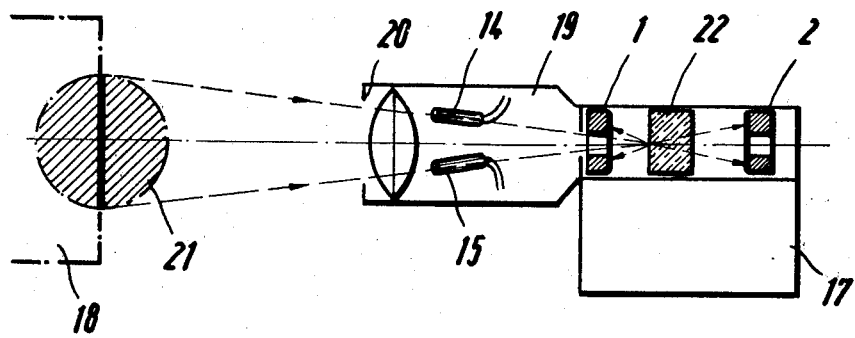
FIG. 2 is a schematic view of the physical arrangement of measuring equipment in relation to rolled stock.

Turning now to FIG. 2, many components of the circuit are included in a housing 17. This casing 17 has position adjacent the rolled stock 18. A tubular element 19 acts as an orienting structure with a front lens to observe a range 21 of the rolled stock. The latter range is particularly determined by a diaphragm 20.

The photo-transistors 14 and 15 are disposed in the fringes of the radiation cone as observed by the optical arrangement of diaphragm 20 plus lens. The outputs of transistors 14, 15 are unbalanced when, for example, the rolled stock runs partially out of the observation field 21, so that the transistors receive significantly different amounts of radiation.

Housing 17 contains additionally the two photoelements 1 and 2, but on opposite sides of a filter 22, which divides the radiation received into the two different frequency components. Housing 17 may contain the other circuit elements of FIG. 1 and is otherwise closed and thermally insulated. It may even have an internal heating source to regulate the internal temperature to a constant value between e.g. 40° to 50° C.

The invention is not limited to the embodiments described above, but all changes and modifications thereof not constituting departures from the spirit and scope of the invention are intended to be included.

We claim:
1. Pyrometer for measuring temperature using first and second photosensitive devices for receiving radiation of different wavelength from the object whose temperature is to be measured, comprising:
    the photosensitive devices being photoelements;
    a first and a second d.c. amplifier with high gain and respectively connected with an input terminal to the first and second photoelement each of said amplifiers having an output terminal;
    a first and second feedback resistor connected respectively from output to input of the first and second amplifier so that zero voltage is dynamically established across each photoelement being passed through with short circuit current over a particular range of radiation and temperature to be measured;
    a circuit forming an output signal representing the quotient of two input signals as applied to two input terminals of the circuit, the outputs of the amplifiers being respectively connected to the input terminals of the circuit to provide the inputs whose ratio is formed by the circuit; and
    means connected to the circuit for receiving said output signal therefrom and providing a representation of said quotient in representation of the temperature of the object.

2. Pyrometer as in claim 1, said means including non linear circuit means for linearizing the output signal of the circuit in relation to the temperature to be represented by the representation provided by said means.

3. Pyrometer as in claim 1, including position-responsive means for detecting the position of the pyrometer in dependence upon the relative orientation thereof to the photoelements.

4. Pyrometer as in claim 3, said position responsive means including a pair of photodetectors, and means connected for rendering the production of the output of said means connected to said circuit.

5. Pyrometer as in claim 4, said photodetectors disposed to respond to fringes of a detection field as observed by said photoelements.

6. Pyrometer as in claim 1, said circuit forming the quotient to the m-th power, and including means to adjust the parameter $m$.

* * * * *